United States Patent
Murthy et al.

(10) Patent No.: US 12,168,401 B2
(45) Date of Patent: Dec. 17, 2024

(54) OPTIMIZED REGENERATIVE BRAKING CONTROL OF ELECTRIC MOTORS USING LOOK-UP TABLES

(71) Applicant: TEXAS INSTRUMENTS INCORPORATED, Dallas, TX (US)

(72) Inventors: Aravind Samba Murthy, Atlanta, GA (US); David Patrick Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/049,319

(22) Filed: Oct. 25, 2022

(65) Prior Publication Data
US 2023/0081528 A1   Mar. 16, 2023

Related U.S. Application Data

(63) Continuation of application No. 17/352,436, filed on Jun. 21, 2021, now Pat. No. 11,479,124, which is a
(Continued)

(51) Int. Cl.
*B60L 7/14* (2006.01)
*B60L 7/18* (2006.01)
(Continued)

(52) U.S. Cl.
CPC .................... *B60L 7/14* (2013.01); *B60L 7/18* (2013.01); *B60L 15/025* (2013.01);
(Continued)

(58) Field of Classification Search
CPC .. B60L 7/14; B60L 7/18; B60L 15/025; B60L 15/2009; B60L 2240/421;
(Continued)

(56) References Cited

U.S. PATENT DOCUMENTS

| | | | | |
|---|---|---|---|---|
| 5,915,801 A | * | 6/1999 | Taga | B60L 7/18 |
| | | | | 903/945 |
| 6,120,115 A | * | 9/2000 | Manabe | B60W 30/18127 |
| | | | | 303/162 |

(Continued)

FOREIGN PATENT DOCUMENTS

| | | |
|---|---|---|
| CN | 101024397 A | 8/2007 |
| CN | 102166961 A | 8/2011 |
| JP | 2013153594 A * | 8/2013 |

OTHER PUBLICATIONS

Chinese Search Report dated Nov. 30, 2020, Chinese Application No. 2016110029734, 2 pages.

*Primary Examiner* — Zoheb S Imtiaz
(74) *Attorney, Agent, or Firm* — Xianghui Huang; Frank D. Cimino

(57) ABSTRACT

A regenerative braking controller for an AC motor. To determine an electromagnetic torque for slowing or stopping the motor, the regenerative braking controller accesses a lookup table to retrieve a braking torque value corresponding to a current estimate of rotor velocity. The retrieved braking torque may correspond to a maximum or minimum torque level at which regenerative braking will occur at the current rotor velocity, or to a torque level at which charging current during regenerative braking will be maximized. If an external mechanical brake is present, the regenerative braking controller can forward an external braking torque signal to a controller so that the mechanical brake can apply the remainder of the braking force beyond that indicated by the regenerative braking torque. A method for establishing the braking torques to be stored in the lookup table is also disclosed.

24 Claims, 6 Drawing Sheets

Related U.S. Application Data continuation of application No. 14/938,602, filed on Nov. 11, 2015, now Pat. No. 11,040,625.

(51) Int. Cl.
| | |
|---|---|
| *B60L 15/02* | (2006.01) |
| *B60L 15/20* | (2006.01) |
| *H02P 3/16* | (2006.01) |
| *H02P 21/22* | (2016.01) |
| *H02P 21/36* | (2016.01) |
| *H02P 27/08* | (2006.01) |

(52) U.S. Cl.
CPC ............ *B60L 15/2009* (2013.01); *H02P 3/16* (2013.01); *H02P 21/22* (2016.02); *H02P 21/36* (2016.02); *H02P 27/08* (2013.01); *B60L 2240/421* (2013.01); *B60L 2240/423* (2013.01); *B60L 2240/427* (2013.01); *B60L 2240/429* (2013.01); *Y02T 10/64* (2013.01); *Y02T 10/72* (2013.01)

(58) Field of Classification Search
CPC ......... B60L 2240/423; B60L 2240/427; B60L 2240/429; H02P 21/22; H02P 21/36; H02P 3/16; H02P 27/08; Y02T 10/64; Y02T 10/72
See application file for complete search history.

(56) References Cited

U.S. PATENT DOCUMENTS

| | | | |
|---|---|---|---|
| 8,567,547 B2 | 10/2013 | Kalatunga | |
| 9,026,296 B1 | 5/2015 | Johri et al. | |
| 9,548,686 B2 | 1/2017 | Magee | |
| 9,692,336 B2 | 6/2017 | Magee et al. | |
| 9,783,063 B2 | 10/2017 | Murthy et al. | |
| 2002/0024306 A1* | 2/2002 | Imai | B60W 10/08 903/910 |
| 2009/0051304 A1* | 2/2009 | Muta | B60L 7/26 903/947 |
| 2009/0069993 A1* | 3/2009 | Inoue | B60W 40/06 701/70 |
| 2009/0145673 A1* | 6/2009 | Soliman | B60K 6/442 701/22 |
| 2010/0168976 A1* | 7/2010 | Andrasko | B60W 30/18136 701/70 |
| 2011/0246012 A1* | 10/2011 | McClain | B60L 15/2045 701/22 |
| 2012/0133202 A1* | 5/2012 | Mui | B60L 3/10 303/152 |
| 2014/0001987 A1* | 1/2014 | Okada | H02P 3/12 318/370 |
| 2014/0046568 A1* | 2/2014 | Kato | B60K 17/356 701/84 |
| 2014/0210383 A1 | 7/2014 | Marcetic et al. | |
| 2015/0084576 A1 | 3/2015 | Magee | |
| 2015/0130264 A1* | 5/2015 | Isono | B60T 8/17 303/3 |
| 2015/0200613 A1* | 7/2015 | Ota | H02P 3/18 318/376 |
| 2015/0232097 A1 | 8/2015 | Luther et al. | |
| 2015/0236632 A1 | 8/2015 | Marohl et al. | |
| 2016/0046287 A1* | 2/2016 | Owen | B60W 10/04 701/43 |
| 2016/0264137 A1* | 9/2016 | Lavoie | B60T 7/22 |
| 2016/0294314 A1 | 10/2016 | Zambada et al. | |
| 2016/0325732 A1* | 11/2016 | Yang | B60K 6/442 |
| 2017/0113695 A1* | 4/2017 | Kim | F02D 41/0087 |
| 2018/0244157 A1 | 8/2018 | Hirakawa et al. | |

\* cited by examiner

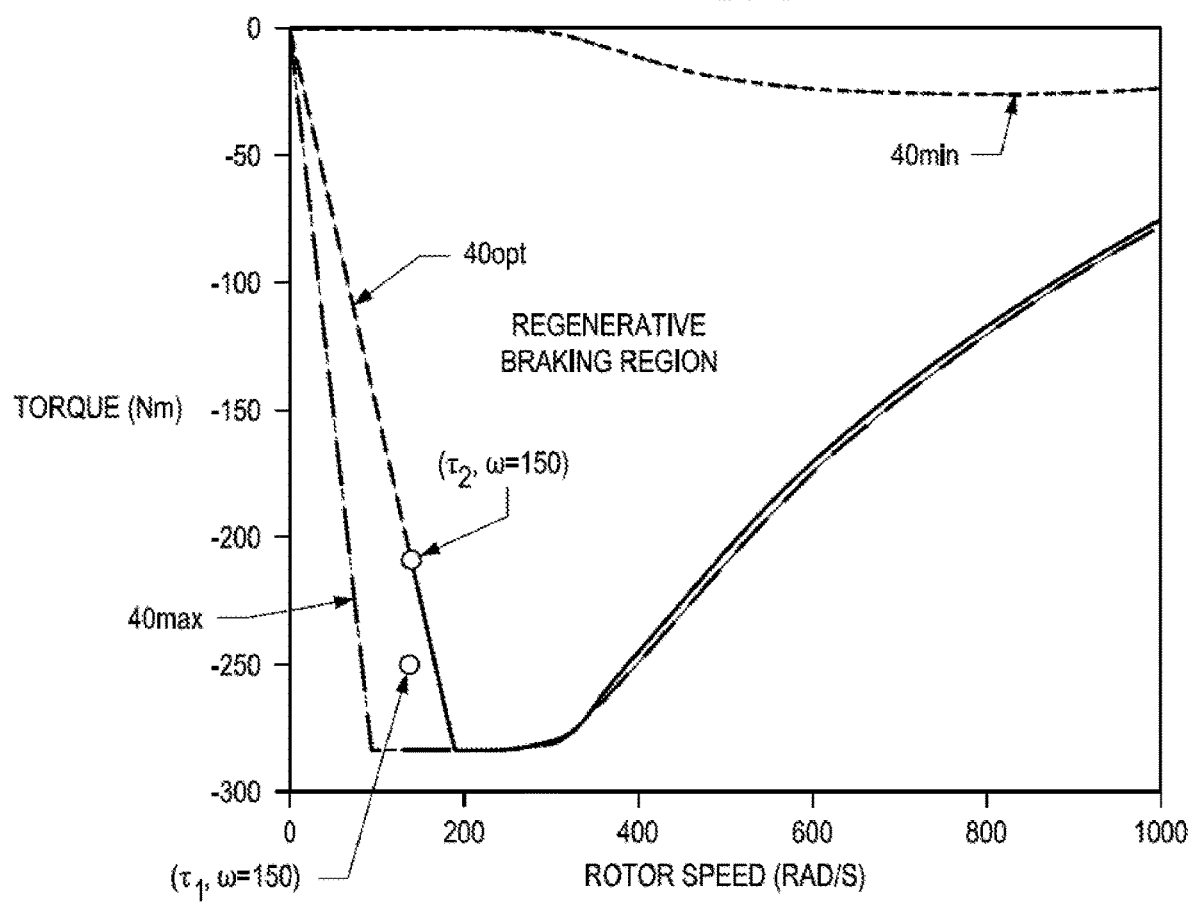

OPTIMIZED REGENERATIVE BRAKING CONTROL OF ELECTRIC MOTORS USING LOOK-UP TABLES

CROSS-REFERENCE TO RELATED APPLICATIONS

This application is a continuation of U.S. patent application Ser. No. 17/352,436, filed Jun. 21, 2021, which is a continuation of U.S. patent application Ser. No. 14/938,602, filed Nov. 11, 2015, now U.S. Pat. No. 11,040,625, each of which is incorporated by reference herein in its entirety.

STATEMENT REGARDING FEDERALLY SPONSORED RESEARCH OR DEVELOPMENT

Not applicable.

BACKGROUND OF THE INVENTION

This invention is in the field of control systems for electric machines. Embodiments described in this specification are more specifically directed to control of electric motors to recover energy using regenerative braking.

Field-oriented control ("FOC") has become commonplace in modern control systems for AC electric motors. According to this approach, stator windings of the AC motor are driven, for example by pulse-width-modulation, in such a way as to maximize the torque/ampere performance of the motor. Field-oriented control of AC motors is a complicated task because the rotation of the magnetic field in the stator with respect to the rotating magnetic field of the rotor can be asynchronous, such that characterization of the operation of the AC motor involves a set of differential equations with time varying coefficients. Indeed, the operative set of differential equations is still nonlinear even in those systems in which the magnetic fields of the stator and rotor are synchronous.

Modern high-speed programmable microcontrollers have been widely adopted for carrying out the complex calculations required for accurate field-oriented control. Many AC motor control algorithms are based on the well-known "Park" transform, which transforms the applicable set of differential equations with angle-dependent coefficients into a set of differential equations that are independent of motor angle. In particular, the Park transform considers motor operation according to a rotating two-dimensional (d, q) coordinate system, where the d axis is aligned with the field flux linkage component (i.e., the rotor flux) and the orthogonal q axis is aligned with the torque component. By separating the field flux linkage and torque components, motor torque can be controlled without affecting the field flux. This decoupling enables the use of techniques such as dynamic torque control and speed control, which can employ proportional-and-integral (PI) control algorithms and the like for the actual controller instantiation.

As known in the art, conventional FOC controllers control the operation of AC motors in response to a desired motor speed input signal in combination with feedback signals indicating the current position and velocity of the rotor. In this regard, speed controllers apply a function such as a proportional-integral control function to an error signal between the desired motor speed and an estimate of the current velocity, to produce direct phase and quadrature phase (d, q) control signals that are applied to the inverse Park transform function. Typically, the inverse Park transform generates spatially fixed ($\alpha$ and $\beta$ phase) control signals from these d and q phase signals and estimates of the current rotor position. The $\alpha$ and $\beta$ phase control signals are then converted by a space vector generator function to multiphase control signals, based on which pulse-width modulated (PWM) pulses are driven onto the stator windings of the motor to apply the desired torque.

In a general sense, electric motors have two mechanical operations, motoring and braking. Motoring refers to the motor operation in which the applied torque and rotational velocity of the motor are in the same direction, while the braking operation applies a torque in the opposite direction from the rotational velocity of the motor. FIG. 1 illustrates the torque-speed plane of an electric motor, with quadrant I representing forward motoring (i.e., torque $\tau>0$ and speed $\omega>0$) and quadrant III representing reverse motoring (i.e., torque $\tau<0$ and speed $\omega<0$). Similarly, quadrants II and IV represent reverse braking (i.e., torque $\tau>0$ with speed $\omega<0$) and forward braking (i.e., torque $\tau<0$ with speed $\omega>0$), respectively. As known in the art, the braking operation can be regenerative in the sense that a net reverse current is produced from the kinetic energy of the rotor as the motor is being braked, essentially allowing the electric motor to operate as an electric generator. If the electrical energy of the net reverse current is fed back to the power source, energy is recovered from the motor as it is slowed. Regenerative braking does not occur at all operating points in the braking quadrants of the torque-speed plane, but only within a subset of those braking quadrants. As such, the torque indicated by the multiphase control signals produced by the field-oriented control system will determine whether energy recovery through regenerative braking occurs, and if so, the extent of the energy recovered.

BRIEF SUMMARY OF THE INVENTION

Disclosed embodiments provide a system and method for controlling an electric machine, such as an AC electric motor, to perform regenerative braking so as to recover energy.

Disclosed embodiments provide such a system and method in which field-oriented control (FOC) is applied in such a fashion as to perform regenerative braking when possible.

Disclosed embodiments provide such a system and method in which field-oriented control (FOC) is applied in such a fashion as to maximize the charging current during regenerative braking.

Disclosed embodiments provide such a system and method in which FOC is applied to maximize the charging current during regenerative braking for interior permanent magnet (IPM) AC motors.

Disclosed embodiments provide such a system and method that is compatible with external braking mechanisms.

Other objects and advantages of the disclosed embodiments will be apparent to those of ordinary skill in the art having reference to the following specification together with its drawings.

According to certain embodiments, a FOC system and method is provided in which multiphase control signals to be applied to the motor during braking are determined so as to perform regenerative braking when possible, and in some embodiments to optimize the energy recovery from regenerative braking. In these embodiments, a lookup table storing data representative of regenerative braking regions in the torque-speed plane is accessed in the determination of the multiphase control signals. In some embodiments, the lookup table stores data representative of operating points of maximum regenerative braking current.

BRIEF DESCRIPTION OF THE SEVERAL VIEWS OF THE DRAWING

FIG. 6 is a plot of curves in the torque-speed plane illustrating the regenerative braking region for an example of an embodiment.

DETAILED DESCRIPTION OF THE INVENTION

The one or more embodiments described in this specification are implemented into a field-oriented control (FOC) scheme for a permanent magnet (PM) type of an AC electric motor, as it is contemplated that such implementation is particularly advantageous in that context. However, it is also contemplated that concepts of this invention may be beneficially applied to other applications, for example other types of electric motors such as AC induction motors, and other machines. Accordingly, it is to be understood that the following description is provided by way of example only, and is not intended to limit the true scope of this invention as claimed.

Figure 2:
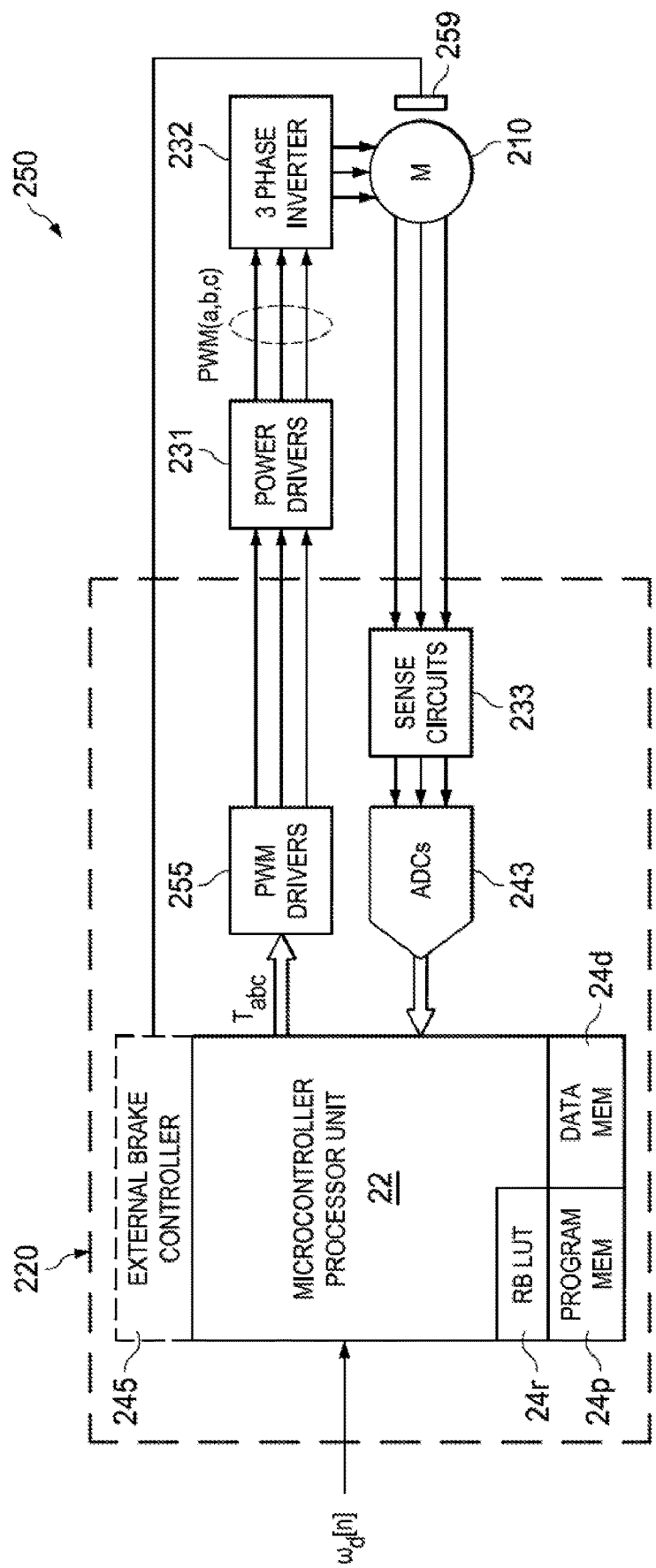
FIG. 2 is a block diagram of a motor controller architecture according to an embodiment.

FIG. 2 illustrates, in the form of a block diagram, an example of a field-oriented control (FOC) control system 250 for an electric machine, according to an embodiment. In the example of FIG. 2, the electric machine under control of this system is permanent magnet synchronous motor 210, which has three stator windings arranged 120° out of phase relative to one another in the conventional manner, and is constructed with permanent magnets on the rotor. As will be apparent to those skilled in the art having reference to this specification, the number of phases in motor 210 may vary from the three phases shown in FIG. 2. In field-oriented control (FOC) systems, such as system 250 according to these embodiments, the application of alternating current to the stator windings is controlled to produce a rotating magnetic field that interacts with the magnetic field from the permanent magnets on the rotor at the appropriate torque to rotate the rotor at the desired speed.

In this embodiment, much of the architecture for controlling the alternating current applied to the stator windings is implemented by programmable microcontroller integrated circuit (MCU) 220, enabling many of the calculations and control loop functions to be carried out in the digital domain. Examples of integrated circuits suitable for use as MCU 220 according to these embodiments include microcontrollers in the C2000 and MSP430 families available from Texas Instruments Incorporated. In the example of FIG. 2, MCU 220 includes microcontroller processor unit 22, which receives a desired motor speed signal $\omega_d[n]$ from external to MCU 220, along with feedback signals from motor 210 as will be described below. Processor unit 22 is coupled to program memory 24p, which stores program instructions for retrieval and execution by processor unit 22 upon the received reference and feedback signals; according to this embodiment, the program instructions stored in program memory 24p cause processor unit 22 to perform the various control functions described in this specification. Processor unit 22 is also coupled to data memory 24d, which stores data applied and calculated by processor unit 22 in its motor control operation. The result of this program execution by processor unit 22 are three-phase data signals Tabc indicative of the pulse-width-modulation duty cycles at which the three phases (i.e., phases a, b, c, respectively) of motor M are to be driven. Data signals Tabc are applied to PWM drivers 255 in MCU 220, which in turn generate output control signals that are applied to power driver circuits 231, which in turn generates the corresponding pulse-width-modulated pulses on lines PWM(a, b, c), at the appropriate frequency and phase that are applied to three-phase inverter 232 for driving motor 210 at the desired speed.

According to these embodiments, processor unit 22 is coupled to regenerative braking lookup table 24r (shown as RB LUT 24r in FIG. 2). As will be described in further detail below, RB LUT 24r is a memory resource that will be used to retrieve, for a current rotor speed, one or more predetermined braking torque limits and levels that can be used to ensure or maximize the charging current during regenerative braking. RB LUT 24r may be realized in non-volatile memory, such as read-only memory (ROM) or electrically programmable read-only memory (EPROM) as may be used for program memory 24p, particularly if its contents are determined for an installation associated with a particular model of motor 210. Alternatively, RB LUT 24r may be realized in volatile memory (e.g., static random access memory, or SRAM), with its contents loaded upon power-up or other reboot of MCU 220. RB LUT 24r may have a random access architecture, in which its contents are accessed by way of memory addresses; in this regard, the address space of RB LUT 24r may be within the address space of an overall memory resource that also includes data memory 24d and program memory 24p. Alternatively, RB LUT 24r may be a content-addressable memory, considering that its data correspond to one or more values (i.e., braking torque limits) associated with each rotor speed. It is contemplated that those skilled in the art having reference to this specification will be readily able to realize RB LUT 24r as desired for a particular implementation.

The feedback side of the control system of FIG. 2 includes sense circuits 233 that in this example sense electrical conditions at motor 210, for example at its stators. As will be evident in the following description for this embodiment, these electrical conditions correspond to currents in the stator windings and to voltages indicative of the inductance of stator windings as a function of rotor position or rotor angle (the terms "rotor position" and "rotor angle" are used synonymously in this description). These sensed electrical parameters are, in this example, communicated to analog-to-digital-converters (ADCs) 243 in MCU 220. ADCs 243 in MCU 220 sample these signals at the frequency of sample clock $T_s$, to generate digital data values representative of the sensed electrical parameters at motor 210. Those digital sampled values are then applied to processor unit 22 for processing according to the control algorithm expressed in program instructions stored in program memory 24p, which described in further detail below, to produce the appropriate drive signals to control motor 210.

In this implementation, MCU 220 also includes optional external brake controller 245, which presents a signal that controls the drive applied to an external brake 259 (also optional). As will be described in further detail below, external brake controller 259 generates its output control signal in response to the received input (e.g., the desired motor speed) and feedback signals, specifically in cooperation with energy recovery functions according to these embodiments.

Figure 3:
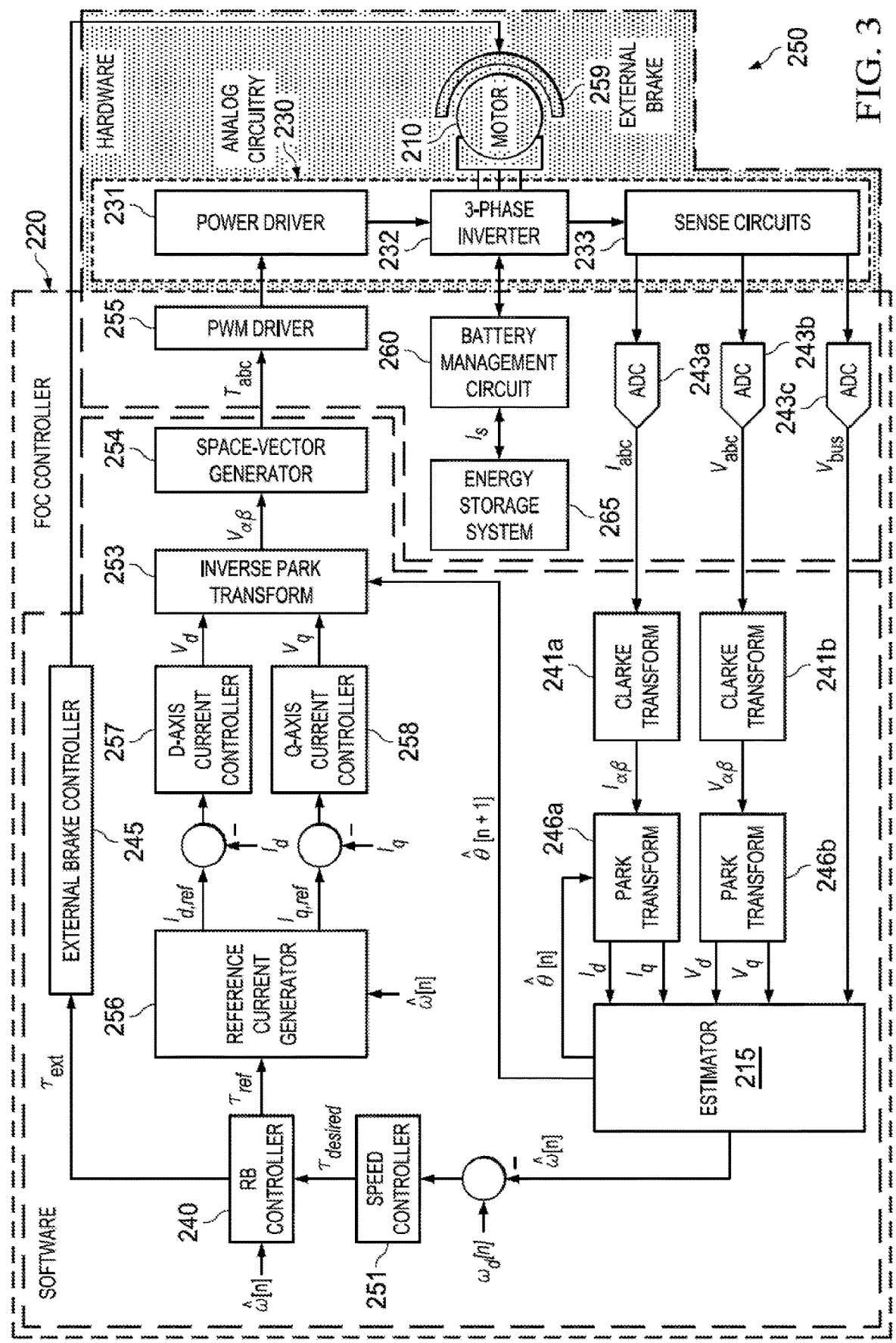
FIG. 3 is a functional block diagram of a digital portion of a microcontroller architecture for motor control according to the embodiment of FIG. 2.

FIG. 3 illustrates the functional architecture of motor system 250 according to an embodiment. As discussed above, it is contemplated that some of the functions in the architecture of FIG. 3 may be performed by processor unit 22 of MCU 220 executing program instructions, as mentioned above, while others are performed by specific hardware components that may also be deployed within MCU 220. In the implementation of FIG. 2, those functions of the architecture that are implemented in software stored in the program memory and executed by the processor unit are shown in an encircled region labeled "SOFTWARE", while those functions that are implemented by way of specific hardware components are shown in an encircled region labeled "HARDWARE". Of course, the particular manner (i.e., hardware vs. software) by way of which various functions in the functional architecture of FIG. 3 may vary, as appropriate for a particular implementation.

Other functions within controller 220 include an energy storage system (ESS) 265, which in this example is a battery, and battery management circuit 260. In this arrangement, battery management circuit 260 is coupled to an output of three-phase inverter 232, and operates to control a maximum level of regenerative braking current flowing into ESS 265 using a current regulation circuit, with that maximum level based on the maximum charging current that ESS 265 can support.

FIG. 3 illustrates the functional architecture of field-oriented control (FOC) motor control system 250, for example as may be implemented within MCU 220 in the hardware architecture of FIG. 2, according to an embodiment. A difference between an external control signal $\omega_d[n]$ indicating the desired motor speed and an estimate $\hat{\omega}[n]$ of the current rotor velocity of motor 210, as determined by the feedback loop portion of this architecture, is applied to speed controller 251, which generates a desired torque signal $\tau_{desired}$ from that difference, for example by applying a conventional control function. Desired torque signal $\tau_{desired}$, and an estimate $\hat{\omega}[n]$ of the current rotor velocity of motor 210, are applied to regenerative braking (RB) controller 240, which will in turn produce a reference torque signal $\tau_{ref}$ for application to reference current generator 256 in response. The functional arrangement and operation of RB controller 240 according to these embodiments will be described in detail below.

Reference current generator 256 operates to produce quadrature phase reference current $I_{q,ref}$ and direct phase reference current $I_{d,ref}$ based on reference torque signal $\tau_{ref}$ from RB controller 240 and an estimate $\hat{\omega}[n]$ of the current rotor velocity. Quadrature phase reference current $I_{q,ref}$ corresponds to the desired torque component (i.e., the q component in the d, q domain), and a difference between that current and quadrature phase feedback current Iq is applied to q-axis current controller 258. Similarly, a difference between direct phase reference current $I_{d,ref}$ and direct phase feedback current $I_d$ is applied to d-axis current controller 257. Controllers 257, 258 operate according to a conventional control function (e.g., proportional-integral) to produce direct phase and quadrature phase control signals $V_d$, Vq, respectively, which are applied to inverse Park transform function 253.

Inverse Park transform function 253 transforms the d and q phase control signals Vd, Vq to spatially fixed α and β phase control signals Vαβ. Because the inverse Park transform requires knowledge of the rotor position (more specifically, the rotor flux or field flux linkage angle), rotor position estimate $\hat{\theta}[n+1]$ for the next control cycle [n+1] is supplied, in this embodiment, by estimator function 215. As shown in FIG. 3, phase control signals Vαβ from inverse Park transform function 253 are applied to space vector generator 254, which produces three-phase data signals Tabc that are supplied to PWM drivers 255, from which the appropriate stator currents are produced via power drivers 231 and inverter 232 and applied to corresponding stator poles of motor 210.

On the feedback side of the control loop in this architecture, Clarke transform function 241a receives sampled currents Iabc associated with the three motor phases and acquired for the current sample period n, as produced by ADCs 243a based on the electrical parameters sensed by sense circuits 233. From these inputs, Clarke transform function 241a produces spatially fixed α and β phase feedback signals Iαβ, which in turn are applied to Park transform function 246a to produce d and q phase feedback signals Id, Iq, respectively. Similarly, Clarke transform function 241b receives sampled voltages Vabc from ADCs 243b, and produce α and β phase voltage feedback signals Vαβ, which are applied to Park transform function 246b to produce d and q phase voltage feedback signals Vd, Vq, respectively. Current feedback signals Id, Iq and voltage feedback signals Vd, Vq as well as sensed bus voltage Vbus from ADCs 243c, are forwarded to estimator function 215, which will generate rotor position and rotor velocity estimates for use in the control loop as noted above. Alternatively or in addition, one of sense circuits 233 may receive a signal from a velocity sensor at motor 210, in which case a direct measurement of rotor velocity is obtained and can be used in the control loop.

Examples of speed and position estimator algorithms and methods suitable for use in estimator function 215 in this embodiment are described in copending U.S. application Ser. No. 14/337,576 and Ser. No. 14/337,595, both filed Jul. 22, 2014, and copending U.S. application Ser. No. 14/880,008 filed Oct. 9, 2015, all such applications commonly assigned herewith and incorporated herein by reference. Copending U.S. application Ser. No. 14/675,196, filed Mar. 31, 2015, commonly assigned herewith and incorporated herein by this reference, describes a motor controller architecture that includes a function for selecting a fractional delay compensation value to be applied in the estimate of rotor position for which pulse-width-modulated drive signals are to be applied to a multi-phase electric motor, which may optionally be included in the functional architecture of control system 250 according to these embodiments.

As mentioned above, the functional architecture of controller 220 includes RB controller 240 in the control loop. As described in copending U.S. application Ser. No. 14/837,810, filed Aug. 27, 2015, commonly assigned herewith and incorporated herein by reference, and in the embodiment shown in FIG. 3, RB controller 240 operates in conjunction with external brake controller 245 to control motor 210. In this embodiment, as noted above, speed controller 251 receives the difference of the reference velocity $\omega_d[n]$ and an angular velocity estimate $\hat{\omega}[n]$, and produces desired torque $\tau_{desired}$ to an input of RB controller 240. RB controller 240 also receives the angular velocity estimate $\hat{\omega}[n]$ from estimator function 215, and in this embodiment in which external brake controller 245 is implemented, provides torque signals $\tau_{ext}$ and $\tau_{ref}$. Torque signal $\tau_{ref}$ from the RB controller 240 is applied to reference current generator 256 as mentioned above, and torque signal $\tau_{ext}$ is external applied to external brake controller 245, for control of the brake 259.

Figure 1:
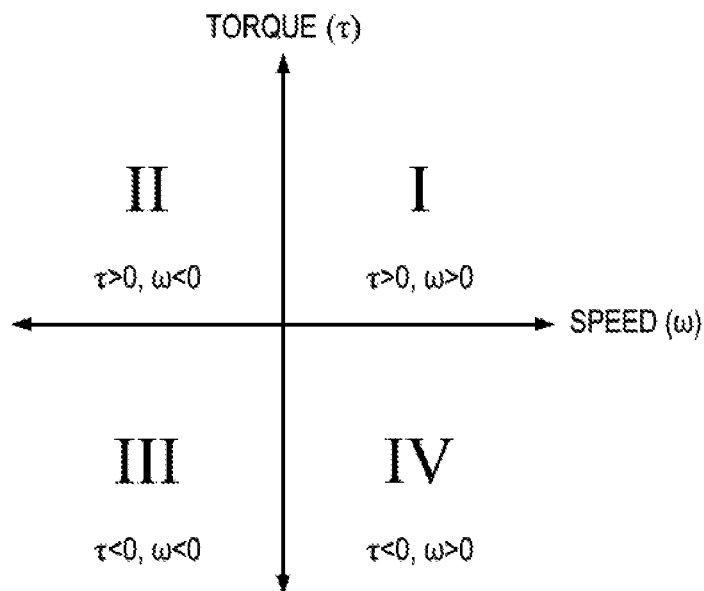
FIG. 1 is a plot of a torque vs. speed indicating the quadrants of rotor speed and torque for a motor.

As described in the above-incorporated application Ser. No. 14/837,810, RB controller 240 operates to determine boundaries of the regions in the braking quadrants (quadrants II and IV in the torque-speed plane of FIG. 1), in which regenerative braking will occur, and generates torque signals $\tau_{ext}$ and $\tau_{ref}$ to operate in those regenerative braking regions when possible, so as to maximize charging current during regenerative braking. The approach used in this above-incorporated application Ser. No. 14/837,810 derives symbolic closed-form expressions for boundaries of the regions in braking quadrants II and IV of the torque-speed plane in which regenerative braking occurs. More particularly, these boundaries express, for each rotor speed, the minimum and maximum braking torques for which regenerative braking occurs, and may also express a braking torque level for each rotor speed at which maximum regenerative braking current can be achieved. This closed-form approach has been observed to work well for non-salient pole permanent magnet synchronous motors (PMSMs) and for motors in which the permanent magnets are surface-mounted at the rotors (such motors referred to as "SPMs"), for example providing closed-form expressions in the torque-speed plane that define these boundaries and the maximum recovery curve. This above-incorporated application Ser. No. 14/837,810 also describes the use of external braking with regenerative braking control, to maximize charging current in combination with attainment of the desired stopping speed.

However, it has been observed, according to these embodiments, that this approach may not be practicable for salient-pole PMSMs and interior permanent magnet motors (IPMs), because the nature of these motors makes it prohibitively difficult to derive closed-form expressions for the regenerative braking boundaries and maximum regenerative braking current curves. These embodiments provide regenerative braking control in which closed-form expressions are not necessary, thus allowing a wide range of electric motors to attain maximum charging current during regenerative braking.

According to these embodiments, regenerative braking lookup table (RB LUT) 24r is provided in MCU 220, as shown in FIG. 2, as a memory resource that stores pre-calculated or otherwise pre-determined braking torque levels for each of a number of rotor speeds. In the functional architecture of FIG. 3, for the case in which the received desired motor speed signal $\omega_d[n]$ indicates that motor 210 is to be slowed down or stopped, regenerative braking controller 240 can access RB LUT 24r to obtain a braking torque level for that speed that can ensure or maximize charging current during regenerative braking. According to these embodiments, these braking torque levels are predetermined for various motor speeds and are stored in RB LUT 24r for later access during operation. By allowing the use of numerical techniques to obtain those braking torques, this arrangement allows the optimization of energy recovery for a wider range of motors, including motors such as IPMs for which closed-form expressions of the regenerative braking boundaries and maximum regenerative braking current curves cannot be readily derived.

It is contemplated that the braking torques stored in RB LUT 24r may be calculated by a number of approaches. For example, these braking torques may be determined for various rotor speeds experimentally, for example by characterizing a particular make and model of motor 210 and measuring the energy recovery performance over varying rotor speeds. Alternatively, these braking torques may be determined by deriving closed-form expressions as described in the above-incorporated application Ser. No. 14/837,810 and then applying varying rotor speeds to those expressions to arrive at the braking torques corresponding to the regenerative braking boundaries and maximum regenerative braking current curves for each of those rotor speeds.

A technique for numerically determining the braking torques stored in RB LUT 24r according to an embodiment will now be described with reference to FIG. 4. This process will determine these braking torques using parameter values associated for the particular motor make and model and performance of the power system and associated circuitry. It is contemplated that the various processes involved in this numerical approach will typically be performed in advance of the manufacture or installation of individual motors and control systems, for example by way of a computer executing corresponding program instructions to determine the braking torques to be stored in instances of RB LUT 24r in control systems for a specific motor model or type.

Figure 5A:
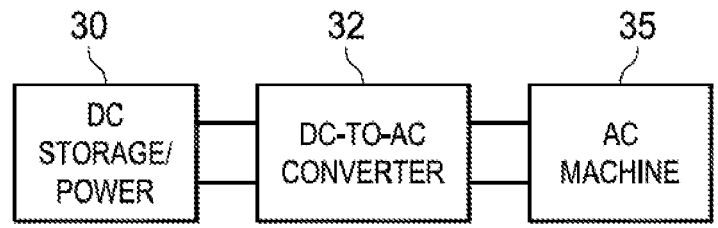
FIG. 5a is an electrical diagram, in block form, of an AC motor and power system for use in developing a set of system equations for braking of the motor, according to an embodiment.

According to this embodiment, determination of the regenerative braking torque levels for a given permanent magnet synchronous machine, such as motor 210 of FIG. 3, begins with process 20 in which system equations are developed that express the behavior of the system. These system equations are based on an equivalent steady-state circuit model for the constituents of the system, which are considered as DC storage/power block 30, DC-to-AC converter block 32, and AC machine 35, as shown in the high level block diagram of FIG. 5a.

Figure 5B:
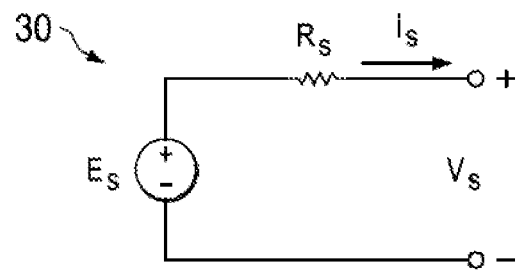
FIGS. 5b through 5d are equivalent circuit models of components in the system of FIG. 5a for use in developing a set of system equations for braking of the motor, according to an embodiment.
Figure 5C:
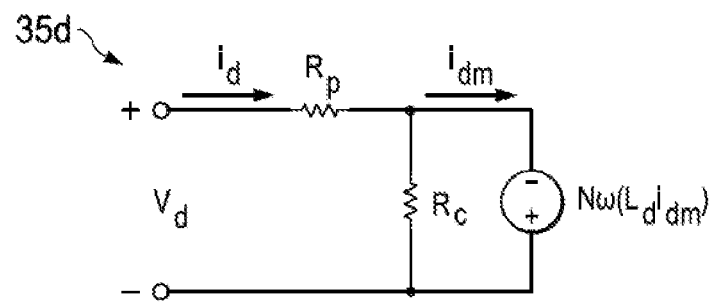
Figure 5D:
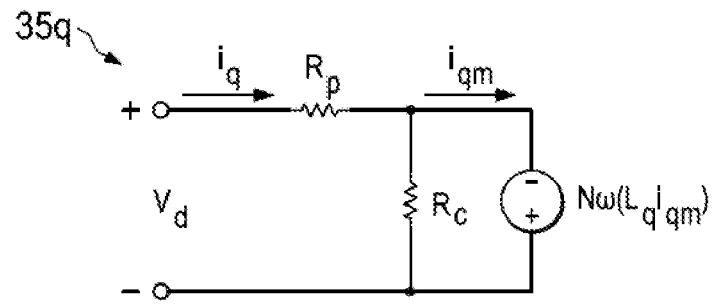

An equivalent circuit model for DC storage/power block 30 of a system based on a storage battery (e.g., ESS 265 of FIG. 3) is shown in FIG. 5b. In this model, voltage $E_s$ is the power source (battery) output voltage and $R_s$ is the source resistance, resulting in an output voltage vs and output current is. In this example, DC-to-AC converter block 32 will be assumed to be lossless, in the sense that there are no conduction or switching losses, and thus no equivalent circuit model is required for this function. FIGS. 5c and 5d show the equivalent circuit models of AC machine block 35 in the d and q dimensions (axes), respectively. In each of the d and q axes, $R_p$ expresses the per-phase stator resistance, $R_c$ expresses the per-phase core-loss resistance, and N is the number of pole-pairs of AC machine block 35 (e.g., motor 210). In FIG. 5c, $i_d$ is the d axis current, $i_{dm}$ is the d axis magnetization current, $L_d$ is the d axis inductance, and $v_d$ is the d axis voltage. Similarly, in FIG. 5d, $i_q$ is the q axis current, $i_q m$ is the q axis magnetization current, $L_q$ is the q axis inductance, and $v_q$ is the q axis voltage. Based on these models, process 20 develops system equations that include the simultaneous equations:

$$\begin{bmatrix} -R_c & 0 & R_p+R_c & 0 & -1 & 0 & 0 & 0 \\ 0 & -R_c & 0 & R_p+R_c & 0 & -1 & 0 & 0 \\ R_c & -N\omega L_q & -R_c & 0 & 0 & 0 & 0 & 0 \\ N\omega L_d & R_c & 0 & -R_c & 0 & 0 & 0 & 0 \\ 0 & 0 & 0 & 0 & -1 & 0 & 0 & u_d \\ 0 & 0 & 0 & 0 & 0 & -1 & 0 & u_q \\ 0 & 0 & u_d & u_q & 0 & 0 & -1 & 0 \\ 0 & 0 & 0 & 0 & 0 & 0 & R_s & 1 \end{bmatrix} \begin{bmatrix} i_{dm} \\ i_{qm} \\ i_d \\ i_q \\ v_d \\ v_q \\ i_s \\ v_s \end{bmatrix} = \begin{bmatrix} 0 \\ 0 \\ 0 \\ -N\omega\Lambda \\ 0 \\ 0 \\ 0 \\ E_s \end{bmatrix} \quad (1)$$

and that also includes an equation for the electromagnetic torque rem:

$$\tau_{em} = N(\Lambda(L_d - L_q)i_{dm})i_{qm} \quad (2)$$

where $\Lambda$ is the magnitude of the permanent magnet flux in the AC machine. The control variables in these system equations are the duty cycle vectors $u_d$ and $u_q$ in the d and q axes, respectively. As known in the art, for a fixed DC-bus voltage, the maximum lengths of the duty cycle vectors $u_d$ and $u_q$ depend on the type of pulse-width-modulation (PWM) strategy and the type of stator machine winding. For example, the maximum length [max($U_{dq}$)] of the duty cycle vector for a wye-connected machine using PWM without 3$^{rd}$ harmonic injection is:

$$[\max(U_{dq})] = \frac{1}{2}\sqrt{\frac{3}{2}}$$

and for a delta-connected machine using PWM without 3$^{rd}$ harmonic injection is:

$$[\max(U_{dq})] = \frac{3}{2\sqrt{2}}$$

In process 22 according to this embodiment, specific motor and power system parameter values are identified and applied to the system equations developed in process 20. These parameter values include those that are relevant or necessary to carry out the calculations involved in determining the applicable braking torques for that particular motor and power system type may include some or all of the following:

| Parameter | Description | Unit of measure |
|---|---|---|
| $E_s$ | Open circuit battery voltage | V |
| $R_s$ | Internal resistance of battery | Ohm |
| N | Number of pole-pairs of motor | — |
| $R_p$ | Per-phase stator winding resistance of motor | Ohm |
| $R_c$ | Per-phase core loss resistance of motor | Ohm |
| $L_d$ | d-axis inductance of motor | mH |
| $L_q$ | q-axis inductance of motor | mH |
| $\Lambda$ | Magnitude of permanent magnet flux | V/rad/sec |

-continued

| Parameter | Description | Unit of measure |
|---|---|---|
| $I_{max}$ | Maximum length of current vector in the d-q plane | A |
| max($U_{dq}$) | Maximum assignable length of the duty-cycle vector in the d-q plane | — |
| $\omega_{max}$ | Maximum mechanical speed of the motor | RPM |
| $J_m$ | Rotor inertia | kg-m$^2$ |
| $B_m$ | Rotor viscous friction co-efficient | N-m/rad/sec |

Additional or different parameters may be added or substituted, or some of these parameters may be omitted, depending on the numerical approach and optimization equations used to determine the braking torques. For example, in some implementations the core loss resistance $R_c$ of the motor may be included as indicated in the above table, while in other implementations the core loss resistance $R_c$ may be omitted without a significant loss of accuracy in the result. The particular values applied for a given motor and power system may be determined by characterization, by reference to stated specifications for the motor and power system, or by other conventional techniques. It is contemplated that the precision that will typically be required for these parameter values will typically allow the use of one set of parameter values for a given model of motor and a given model of power system (either on a component-by-component basis or for the system as a whole), without requiring entry of different parameter values for each particular instance of the motor or power system. Of course, if a particularly precise installation is contemplated, it may be advantageous to characterize and measure that particular motor instance and power system instance, so that the braking torques and energy recovery can be tuned to obtain the best available optimization.

According to this embodiment, optimization process 24 is then performed to determine, for each rotor speed w over a desired operating range, the minimum and maximum braking torques at which regenerative energy recovery occurs. By implication, regenerative braking will occur at those braking torques between these two limits at each rotor speed. As mentioned above, many motor types are not well suited for the determination of these braking torque limits by solving closed-form expressions; in addition, even for those motor types that do give rise to closed-form expressions, one or more of the assumptions underlying those expressions may be found to be imprecise for a particular motor or system type. According to this embodiment, therefore, one or more optimization problems are formulated in advance, and numerically solved from the system equations developed in process 20 for the parameter values applied in process 22 to determine the regenerative braking torque levels over the rotor speed range.

In process 24, the minimum and maximum braking torques at selected rotor speeds are determined from respective optimization problems. In this embodiment, these optimization problems are constructed as:

Problem 1: Minimize electromagnetic torque $\tau_{em}$, where:

$$\|u_{dq}\| \leq \max(U_{dq}), \|i_{dq}\| \leq I_{max}, \tau_{em} \leq 0, i_s \leq 0$$

Problem 2: Maximize electromagnetic torque $\tau_{em}$, where:

$$\|u_{dq}\| \leq \max(U_{dq}), \|i_{dq}\| \leq I_{max}, \tau_{em} \leq 0, i_s \leq 0$$

Both of these optimization problems are constrained by the system equations (1) and (2) described above. In process 24, these optimization problems are solved at each rotor speed w over a range of operating speeds to generate the bounds of regenerative braking in the forward braking quadrant IV of the torque-speed plane of FIG. 1. Typically, the behavior of the motor and power system is symmetric in the torque-speed plane, and as such the same bounds will apply in reverse braking quadrant II.

In optimization process 26, the braking torques at which regenerative braking provides the maximum energy recovery are determined, by solving another optimization problem over the range of operating speeds:

Problem 3: Minimize output current is from the power system, where:

$$\|u_{dq}\| \le \max(U_{dq}), \|i_{dq}\| \le I_{max}, \tau_{em} \le 0, i_s \le 0$$

This optimization problem is also constrained by the system equations (1) and (2) described above. In this embodiment, optimization process 26 determines, for each rotor speed w over the operating range, the braking torque at which the current output by the battery is at its minimum, which conversely corresponds to the torque at which the charging current during regenerative braking is at a maximum.

Figure 4:
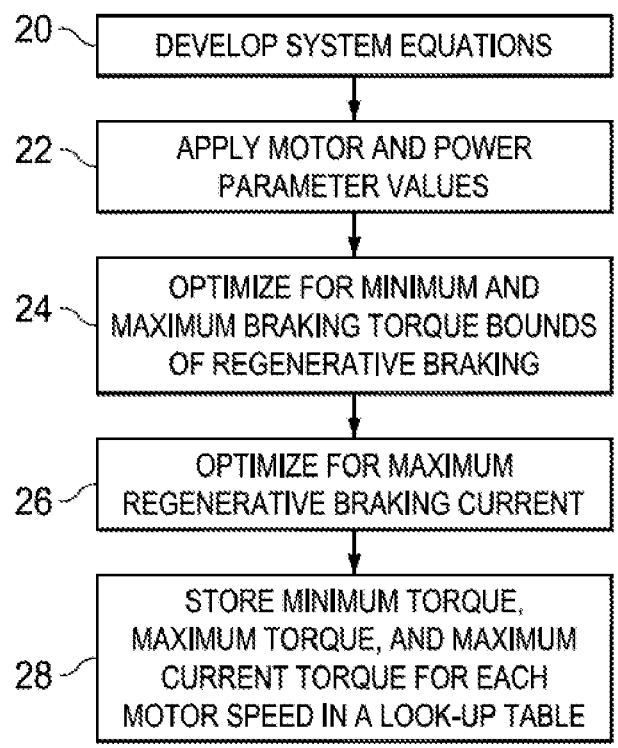
FIG. 4 is a flow diagram illustrating the operation of determining braking torques over a range of rotor speed for use in a look-up table in the architecture of FIG. 2 according to an embodiment.

It is contemplated that the particular optimization problems, and indeed which optimization problems and braking torques derived, may vary from that shown in FIG. 4. Specifically, the particular order in which optimization processes 24, 26 are performed may vary from that shown in FIG. 4, and indeed not all of the minimum, maximum, and optimum braking torques need be determined. For example, it may be desirable to omit optimization process 24 and instead perform only optimization process 26 to determine the optimum braking torque over speed, or vice versa for that matter. In addition, the numbers of motor speeds (i.e., the granularity) within the characterized range that are subjected to optimization processes 24, 26 may vary among the various braking torques.

FIG. 6 illustrates a plot, in quadrant IV (i.e. the forward braking quadrant) of the torque-speed plane, of the braking torque limits determined by an instance of processes 20 through 26 for an example of an interior permanent magnet motor (IPM). Curve 40min in FIG. 6 illustrates the minimum braking torque at which regenerative braking occurs, for each rotor speed ranging from 0 to 1000 rad/sec. Curve 40max indicates the maximum braking torque at which regenerative braking occurs over that same range of 0 to 1000 rad/sec. These two curves 40min, 40max correspond to the results of optimization process 24 described above, as applied to this particular motor and power system. As shown in FIG. 6, the region in the torque-speed plane between these two curves 40min and 40max is the region in which some level of regenerative braking occurs. Curve 40opt of FIG. 6 illustrates the results of optimization process 26 in this example, and as such indicates the braking torques for rotor speeds ranging from 0 to 1000 rad/sec at which charging current will be maximized. The shapes of these curves 40min, 40max, 40opt in FIG. 6 illustrate the inability of a closed-form expression to specify these braking torque limits and optimums. It has been observed, in connection with these embodiments, that the braking torque curves in FIG. 6 is generally representative, in shape if not in numerical values, of other IPMs and corresponding power systems.

Referring back to FIG. 4, according to this embodiment, process 28 is then performed to store the results of optimization processes 24, 26 in a memory resource, specifically in the form of a look-up table to be included in each instance of a control system for that motor type and corresponding power system. As mentioned above, it is contemplated that the process of FIG. 4 will generally be performed "off-line",
outside of the manufacturing flow. In the physical arrangement of FIG. 2, for example, the construction or configuration of each MCU 220 at the time of its manufacture, or at the time of manufacturing the overall motor and control system, will then include the loading of the results determined in processes 24, 26 into RB LUT 24*r* of that MCU 220. Alternatively, if the non-volatile memory capacity of MCU 220 allows, it may be possible to load multiple instances of braking torque LUTs into that memory space of each MCU 220; programming or other configuration of MCU 220 when installed may then select the appropriate RB LUT 24*r* for use in its eventual application. Further in the alternative, it is contemplated that MCU 220 may be manufactured with an empty RB LUT 24*r*, in which case the system assembler or user would load the contents of RB LUT 24*r* when installed, for example in similar manner as a firmware upgrade. It is contemplated that these and other variations on the manner in which RB LUT 24*r* is configured or loaded, such variations apparent to those skilled in the art having reference to this specification, are within the scope of the invention as claimed below.

Figure 7:
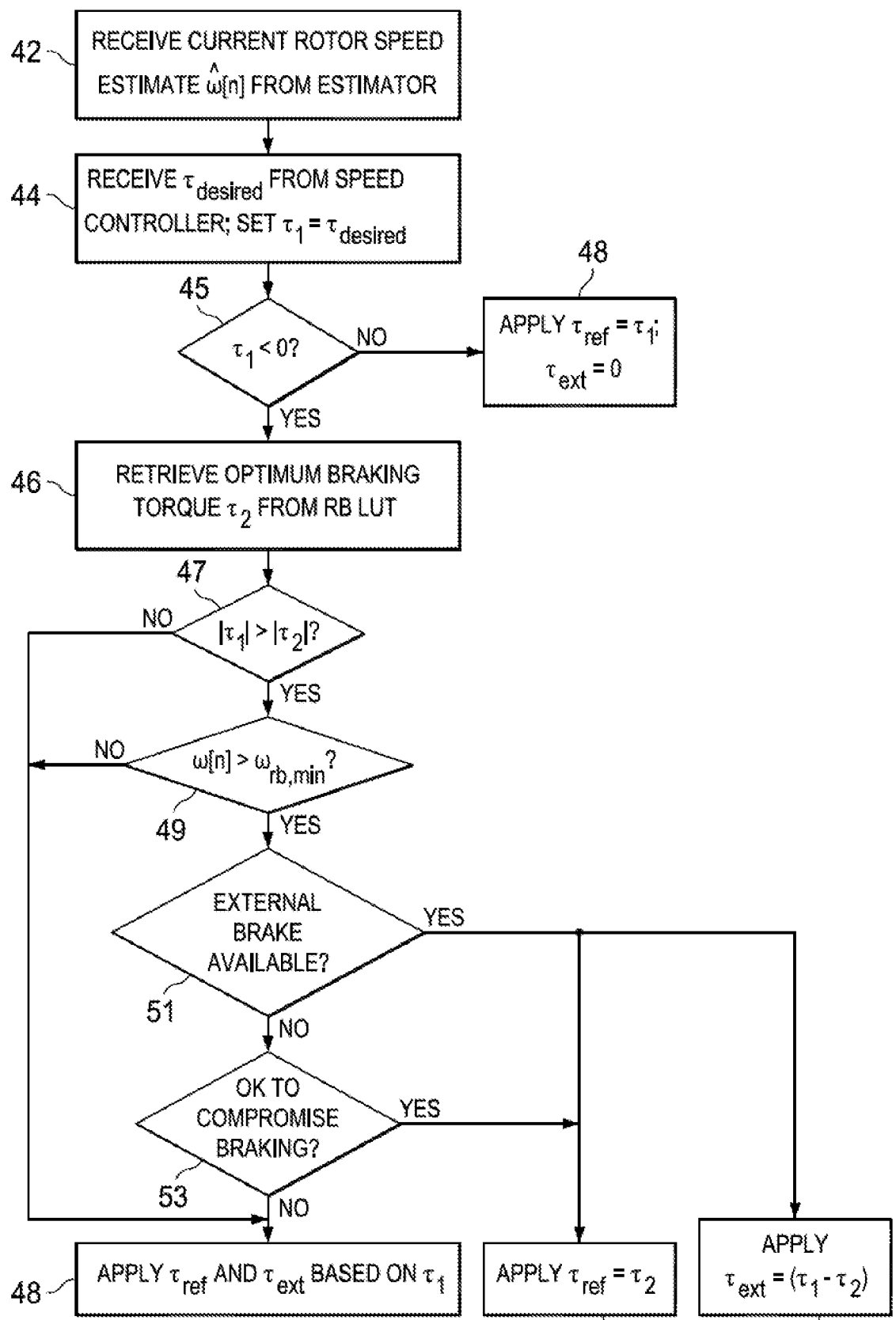
FIG. 7 is a flow diagram illustrating the operation of a regenerative braking controller in the architecture of FIGS. 2 and 3 in braking a motor according to an embodiment.

Referring now to FIG. 7, the operation of regenerative braking (RB) controller 240 of system 250 (FIG. 3) in controlling the braking of motor 210 according to an embodiment will now be described in detail. In this operation, referring to the example physical architecture, it is presumed that RB LUT 24*r* is pre-loaded in an instance of process 28 (FIG. 4), with the appropriate braking torque limits and levels as determined by numerical optimization processes 24, 26 for the type of motor 210 and the power system of ESS 265, battery management circuit 260, and inverter 232. In addition, as will be apparent from this description, optional external brake controller 245 and external brake 259 are installed in system 250; it will also become apparent, however, that RB controller 240 can readily operate in the absence of such an external brake function.

As described in the above-incorporated patent application Ser. Nos. 14/337,576, 14/337,595, and 14/675,196, the control loop of system 250 operates on a periodic basis, with the rotor speed and position determined at one sample period n being used to determine the appropriate control signals to be applied to the motor in a next sample period n+1. It is contemplated that those skilled in the art having reference to this specification will be able to realize these embodiments in connection with other time-based approaches to feedback control of the motor as appropriate for a particular application, without undue experimentation.

The operation of RB controller 240 in determining the appropriate braking torque for motor 210 begins in process 42 by the receipt of a current rotor velocity estimate [n] from estimator function 215. While this description will refer to the functional architecture of FIG. 3 in which rotor velocity is estimated based on sensed currents and voltages, transformed into the d and q axis representations by Clarke transforms 241 and Park transforms 246, a direct measurement of rotor velocity such as from a velocity sensor at motor 210 may alternatively (or additionally) be used in place of this current rotor velocity estimate. In addition, while this description will be for the case of braking a forward motion by the application of a reverse torque, it will be recognized by those skilled in the art that reverse braking (quadrant II) would be carried out in much the same manner but with opposite-signed values. In process 44, RB controller 240 receives the torque signal $\tau_{desired}$ from speed controller 251. This torque signal $\tau_{desired}$ is typically determined by the application of the appropriate control function (e.g., proportional-integral) by speed controller 251 based upon the difference between current rotor speed estimate $\hat{\omega}[n]$ and the desired rotor speed signal $\omega_d[n]$ received from external to system 250. In effect, torque signal $\tau_{desired}$ expresses a raw braking torque that is to be applied to slow motor 210 from its current rotor speed $\hat{\omega}[n]$ to the desired rotor speed $\omega_d[n]$. Also in process 44, RB controller 240 sets a torque value n to this torque signal $\tau_{desired}$.

In decision 45, RB controller 240 determines whether torque signal $\tau_{desired}$ from speed controller 251 indicates a braking torque, which for the case of forward motion is a negative value. If torque signal $\tau_{desired}$ is a forward torque (decision 45 returns a "no" result), RB controller 240 performs no active function and forwards torque value n (which at this point is the torque signal $\tau_{desired}$ from speed controller 251) as torque signal $\tau_{ref}$ to reference current generator 256. RB controller 240 communicates a zero value for torque $\tau_{ext}$ to external brake controller 245, so that external brake 259 is not applied to motor 210. Control of motor 210 to continue its rotation in the forward direction is then carried out in the conventional manner, as described above.

If decision 45 determines that torque signal $\tau_{desired}$ is a braking torque (decision 45 returns a "yes"), RB controller 240 then accesses RB LUT 24r to obtain a desired braking torque value $\tau_2$ in process 46. In this embodiment in which RB LUT 24r store braking torques for each motor speed over the operating range, process 46 involves the access of one or more memory locations of RB LUT 24r that are indicated by the rotor speed estimate $\hat{\omega}[n]$ from estimator function 215 for the current sample period n. The particular manner in which RB LUT 24r is accessed will depend on the architecture of that memory resource, and may involve the translation of the current rotor speed estimate $\hat{\omega}[n]$ into a memory address, or may apply all or part that estimate to RB LUT 24r if realized as a content-addressable memory.

The braking torque data retrieved from RB LUT 24r in process 46 may include one or both of the minimum and maximum braking torques (i.e., the points on curves 40min, 40max of FIG. 6) for the current rotor speed, the optimum braking torque (i.e., the point on curve 40opt of FIG. 6) for the current rotor speed, or both. If the retrieved braking torque from RB LUT 24r is the optimum braking torque at the current rotor speed, this optimum braking torque value itself may be used as torque value $\tau_2$. Alternatively, if one or both of the minimum and maximum braking torque limits are retrieved from RB LUT 24r in process 46, the setting of torque value $\tau_2$ may involve additional decisions to be executed by RB controller 240, including selection of which of these limits should be used, based on whether the desired braking torque value n is higher or lower than the regenerative braking range indicated by the retrieved limits. It is contemplated that those skilled in the art having reference to this specification will be readily able to implement the appropriate logic and program instructions as appropriate to execute these determinations, without undue experimentation.

According to this embodiment, it is contemplated that the braking torque values stored in RB LUT 24r will have been established at discrete rotor speeds over the operating range. As such, the current rotor speed estimate $\hat{\omega}[n]$ from estimator function 215 may not exactly match one of the rotor speeds for which braking torques are stored in RB LUT 24r, so the result of process 46 may be an estimate of the braking torques based on one or more retrieved braking torque values, for example that of a rotor speed closest to the current rotor speed estimate $\hat{\omega}[n]$. Alternatively, process 46 may retrieve the braking torques for the next higher and next lower rotor speeds relative to the rotor speed estimate $\hat{\omega}[n]$, and performing a linear interpolation between the two corresponding retrieved braking torques to arrive at the appropriate limits for the current rotor speed. It is contemplated that these and other variations on the manner in which RB LUT 24r is accessed to obtain the regenerative braking torque limits and optimum operating point can readily be implemented by those skilled in the art having reference to this specification.

In decision 47, RB controller 240 determines whether the absolute value of the desired braking torque (Ti) is greater than the absolute value of the regenerative braking torque (n) corresponding to the maximum charging current determined by the access of RB LUT 24r in process 46. If so (decision 47 is "yes"), then the regenerative braking algorithm proceeds to decision 49, in which RB controller 240 determines whether current rotor speed estimate $\hat{\omega}[n]$ is above some minimum rotor speed $\omega_{rb,min}$ for which regenerative braking is to be applied. As the braking operation is carried out over multiple sample periods, the application of a braking torque selected to obtain energy recovery through regenerative braking would asymptotically reduce the rotor speed toward its desired value, but never precisely reach that desired speed because typically the maximum stopping torque would never be applied in lieu of a lesser torque that would provide some energy recovery, even if minimal. Accordingly, it is efficient to effectively disable regenerative braking as rotor speeds become very slow, particularly considering that little energy would be recovered at these speeds even if enabled. Decision 49 thus ensures that regenerative braking is considered if the current rotor speed estimate $\hat{\omega}[n]$ is above some minimum rotor speed $\omega_{rb,min}$, as may be selected by the system designer or integrator.

If the current rotor speed estimate $\hat{\omega}[n]$ indicates that regenerative braking is to be enabled (decision 49 is "yes"), decision 51 is then performed by RB controller 240 to determine whether an external brake is available. This determination may simply be hardwired if external brake 259 is not installed in system 250; alternatively, decision 51 may determine whether such an installed external brake 259 has been selectively enabled for the current mode of operation of motor 210. If external brake 259 is available and enabled (decision 51 is "yes"), then RB controller 240 can derive an external torque $\tau_{ext}$ to ensure or optimize regenerative braking, while using external brake 259 to apply the rest of the desired braking force. This operation is performed by RB controller 240 in process 50, by forwarding a value of torque signal $\tau_{ref}$ corresponding to torque value $\tau_2$ to reference current generator 256, according to which the control loop will generate the corresponding multiphase control signals to effect that electromagnetic braking at motor 210. In process 52, RB controller 240 forwards a value of external torque signal $\tau_{ext}$ to external brake controller 245 corresponding to the difference ($\tau_1-\tau_2$) between the desired braking torque $\tau_{desired}$ and the applied electromagnetic torque $\tau_{em}$. External brake controller 245 in turn will control external brake 259 in response to external torque signal $\tau_{ext}$ to apply the remainder of the braking force.

FIG. 6 illustrates an example of the operation of RB controller 240 in applying a combination of electromagnetic and external braking. For this example, motor 210 is operating at a current rotor speed estimate $\hat{\omega}[n]$ of about 150 rad/sec and the braking is intended to slow or stop the motor from that speed to a lower speed (e.g., zero). In process 44, RB controller 240 sets its torque signal n to the value of desired braking torque $\tau_{desired}$ from speed controller 251, which in this example is about −250 Nm. As evident from FIG. 6, the point in the torque-speed plane corresponding to a desired braking torque $\tau_1=\tau_{desired}=-250$ Nm at a rotor speed of 150 rad/sec falls below the maximum charging current regenerative braking torque obtained from RB LUT 24r in process 46, which in this example is a braking torque value $\tau_2$ of $-223.5$ Nm at the rotor speed of 150 rad/sec. For the case in which external brake 259 is available and enabled (decision 51 is "yes"), RB controller 240 will issue a value of torque signal $\tau_{ref}$ corresponding to torque value $\Sigma_2=-223.5$ Nm to reference current generator 256 in process 50, and will issue a value of torque signal $\tau_{ext}$ corresponding to torque value $(\tau_1-\tau_2)=(-250-(-223.5))=-26.5$ Nm to external brake controller 245 in process 52.

As mentioned above, RB controller 240 according to this embodiment may operate in the absence of an external brake system (i.e., decision 51 returns a "no" result). In this case, RB controller 240 executes decision 53 to determine whether it is acceptable to compromise braking distance in order to maximize regenerative braking. It is contemplated that this determination will typically be performed in response to an external signal, for example as may be generated by logic within processor unit 22 in response to the motor environment, other user inputs, the rapidity with which braking has been applied such as in the case of an emergency stop, and the like. If so (decision 53 is "yes'), then RB controller 240 will execute process 50 to forward a value of torque signal $\tau_{ref}$ corresponding to torque value $\tau_2$ to reference current generator 256, in response to which the control loop will generate the corresponding multiphase control signals to motor 210 for the next sample period n+1 to effect that electromagnetic braking. Of course, since no external brake 259 is available in this case, a longer stopping time will be experienced that would have occurred without regenerative braking according to this embodiment, but at a benefit of additional recovered energy.

If the current situation is such that braking cannot be compromised in favor of energy recovery (decision 53 is "no"), RB controller 240 will carry out process 48 to apply a torque signal $\tau_{ref}$ corresponding to torque value $\tau_1=\tau_{desired}$ as received from speed controller 251 in process 44. Because external brake 259 is not available, no torque signal $\tau_{ref}$ will be generated in this instance of process 48.

If the absolute value of the desired braking torque $(\tau_1)$ is not greater than the absolute value of the regenerative braking torque $(\tau_2)$ corresponding to the maximum charging current, as indicated by decision 47 returning a "no" result, the regenerative braking algorithm will be effectively disabled, and in process 48 the reference torque $\tau_{ref}$ is set to torque n and the external braking torque $\tau_{ext}$ for systems including external brake controller 245 is set to zero. Similarly, if the current rotor speed estimate $\omega[n]$ is below the minimum rotor speed $\omega_{rb,min}$, as indicated by decision 49 returning a "no" result, process 48 is executed by RB controller to apply torque signal $\tau_{ref}$ corresponding to torque value $\tau_1=\tau_{desired}$, and also perhaps a torque signal $\tau_{ext}$ to external brake controller 245 to control the application of external brake 259 as indicated by the conventional braking algorithm in system 250.

Following this instance of the braking operation in the generation of multiphase braking control signals, and external braking if desired, this process of FIG. 7 will be again repeated for each successive sample period following the next sample period n+1, as typical for FOC motor control. As mentioned above, if only electromagnetic regenerative braking is applied (i.e., with no assist from mechanical braking), motor 210 will slow asymptotically toward the desired rotor speed. If that desired rotor speed is zero, full braking will occur once the rotor speed approaches zero, through the operation of decision 49 according to this embodiment.

According to these embodiments, regenerative braking may be carried out for a wide range of synchronous machine types, including such machines as IPMs for which the operating regime for regenerative braking cannot be reduced to closed-form expressions. These embodiments thus permit the use of extremely accurate models of the motor and power system involved, specifically so as to take into account parameters that may be specific to the make and model of particular motors. In addition, these embodiments can be operated with or without the assistance of external mechanical braking, while still maximizing the charging current during regenerative braking. In addition, it is contemplated that the storing and access of braking torques in a lookup table, as used in connection with these embodiments, will reduce the computational load of the regenerative braking controller and can thus maximize the performance of the motor control system, facilitating a corresponding increase in the frequency at which the control loop operates.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A system comprising:
   memory configured to store a look-up table that includes a set of regenerative braking torque values over a range of rotor speeds of a motor;
   a processing resource coupled to the memory; and
   a non-transitory memory coupled to the processing resource and storing instructions that, when executed, cause the processing resource to:
   receive a desired rotor speed of the motor;
   determine a current rotor speed of the motor;
   determine a desired torque value associated with braking based on the desired rotor speed and the current rotor speed;
   access the look-up table to determine braking torque data associated with the current rotor speed; and
   provide a set of data signals configured to control the motor based on a comparison of the braking torque data and
   the desired torque value.

2. The system of claim 1, wherein the look-up table includes a set of maximum regenerative braking torque values and a set of minimum regenerative braking torque values over the range of rotor speeds.

3. The system of claim 1, wherein the look-up table includes a set of maximum regenerative braking torque values, a set of minimum regenerative table, and a set of optimum regenerative braking torque values over the range of rotor speeds at which charging current is maximized.

4. The system of claim 1, further comprising:
   a pulse-width modulation driver coupled to the processing resource and configured to:
   receive the set of data signals; and
   provide, based on the set of data signals, a set of pulse-width-modulation control signals configured to control the motor; and a power driver circuit coupled to the pulse-width modulation driver and configured to:
  receive the set of pulse-width-modulation control signals; and
  provide, based on the set of pulse-width-modulation control signals, a set of pulse-width-modulation pulses configured to control the motor.

5. The system of claim 4, further comprising a three-phase inverter coupled to the power driver circuit and configured to couple to the motor, wherein the three-phase inverter is configured to:
  receive the set of pulse-width-modulation pulses; and
  drive the motor according to the set of pulse-width-modulation pulses.

6. The system of claim 5, further comprising a battery management circuit coupled to the three-phase inverter and configured to couple to an energy storage system, wherein the battery management circuit is configured to perform regenerative braking by providing a charging current to the energy storage system.

7. The system of claim 1, further comprising:
  a first analog-to-digital converter coupled to the processing resource and configured to couple to the motor to provide a motor current measurement to the processing resource;
  a second analog-to-digital converter coupled to the processing resource and configured to couple to the motor to provide a motor voltage measurement to the processing resource; and
  a third analog-to-digital converter coupled to the processing resource and configured to couple to the motor to provide a bus voltage measurement to the processing resource, wherein the processing resource is further configured to determine the current rotor speed of the motor based on the motor current measurement, the motor voltage measurement, and the bus voltage measurement.

8. The system of claim 7, wherein the processing resource is further configured to perform a Clarke transform and a Park transform on each of the motor current measurement and the motor voltage measurement.

9. The system of claim 1, wherein the processing resource is further configured to:
  determine whether the current rotor speed is above a minimum regenerative braking rotor speed; and
  provide the set of data signals configured to control the motor to produce regenerative braking based on the current rotor speed being above the minimum regenerative braking rotor speed.

10. The system of claim 1, wherein the processing resource is further configured to:
  identify, from the look-up table, a first regenerative braking torque value associated with a first rotor speed and a second regenerative braking torque value associated with a second rotor speed, wherein the current rotor speed is between the first rotor speed and the second rotor speed; and
  perform interpolation on the first regenerative braking torque value and the second regenerative braking torque value to determine the braking torque data associated with the current rotor speed.

11. The system of claim 1, wherein:
  the braking torque data includes data representing an optimum regenerative braking torque value; and
  the processing resource is configured to:
    determine that the desired torque value exceeds the optimum regenerative braking torque value; and
    based on determining that the desired torque value exceeds the optimum regenerative braking torque value,
      determine a difference between the desired torque value and the optimum regenerative braking torque value,
      determine that an external brake is available; and
      based on determining that the external brake is available,
        provide the set of data signals to control the motor to produce the optimum regenerative braking torque value; and
        providing another set of data signals to cause the external brake to produce the difference between the desired torque value and the optimum regenerative braking torque value.

12. The system of claim 11, wherein the processing resource is configured to:
  determine that the external brake is not available; and
  based on determining that the external brake is not available,
    determine that compromise of a braking distance is acceptable; and
    based on determining that compromise of the braking distance is acceptable, provide the set of data signals to control the motor to produce the optimum regenerative braking torque value.

13. The system of claim 11, wherein the processing resource is configured to:
  determine that the external brake is not available; and
  based on determining that the external brake is not available,
    determine that compromise of the braking distance is not acceptable; and
    based on determining that compromise of the braking distance is not acceptable, provide the set of data signals to control the motor to produce the desired torque value.

14. The system of claim 11, wherein the processing resource is configured to:
  determine that the desired torque value does not exceed the optimum regenerative braking torque value; and
  based on determining that the desired torque value does not exceed the optimum regenerative braking torque value, provide the set of data signals to control the motor to produce the desired torque value.

15. The system of claim 1, wherein the motor is a permanent magnet electric motor.

16. A method comprising:
  receiving a desired rotor speed of a motor;
  determining a current rotor speed of the motor;
  determining a desired torque value based on a difference between the current rotor speed and the desired rotor speed;
  based on determining that the desired torque value is less than zero, retrieving braking torque data from a regenerative braking table, the regenerative braking table including a set of regenerative braking torque values over a range of rotor speeds of the motor;
  providing a set of data signals configured to control the motor to transition from the current rotor speed to the desired rotor speed based on a comparison of the braking torque data retrieved from the regenerative braking table and the desired torque value; and
  controlling the motor using the set of data signals to produce regenerative braking.

17. The method of claim 16, further comprising:
causing an external brake to brake the motor based on the desired torque value exceeding a regenerative braking torque threshold.

18. The method of claim 16, wherein the regenerative braking table includes a set of maximum regenerative braking torque values and a set of minimum regenerative braking torque values over the range of rotor speeds.

19. The method of claim 16, wherein the regenerative braking table includes a set of optimum regenerative braking torque values over the range of rotor speeds at which charging current is maximized.

20. The method of claim 16, further comprising providing, by a power driver circuit, a set of pulse-width-modulation pulses based on the set of data signals to control the motor.

21. The method of claim 20, further comprising:
receiving the set of pulse-width-modulation pulses by a three-phase inverter; and
driving the motor by the three-phase inverter according to the set of pulse-width-modulation pulses.

22. The method of claim 16, further comprising receiving a motor current measurement, a motor voltage measurement, and a bus voltage measurement, wherein the determining of the current rotor speed of the motor is based on the motor current measurement, the motor voltage measurement, and the bus voltage measurement.

23. The method of claim 16, further comprising determine whether the current rotor speed is above a minimum regenerative braking rotor speed, wherein controlling the motor using the set of data signal to produce regenerative braking is based on the current rotor speed being above the minimum regenerative braking rotor speed.

24. A method, comprising:
developing system equations representative of behavior of an electric machine;
identifying parameters of the electric machine;
applying the parameters to the system equations;
determining, for a rotor speed range of the electric machine, a set of minimum braking torques and a set of maximum braking torques associated with regenerative energy recovery using the electric machine based on the parameters applied to the system equations; and
storing the set of minimum braking torques and the set of maximum braking torques in a lookup table in a memory resource.

* * * * *